United States Patent [19]
Chin

[11] Patent Number: 5,539,383
[45] Date of Patent: Jul. 23, 1996

[54] WATER DETECTION ALARM

[76] Inventor: Suey N. Chin, 6928 Bonnot Dr., Norfolk, Va. 23513-1102

[21] Appl. No.: 85,778

[22] Filed: Jul. 1, 1993

[51] Int. Cl.$^6$ ................................................. G08B 21/00
[52] U.S. Cl. .................... 340/604; 320/39; 324/664; 340/326; 340/514; 340/693
[58] Field of Search .................. 340/604–05, 693, 340/326, 514–16, 636; 200/61.04–61.06; 307/64, 66; 324/664; 320/39, 48, 54

[56] References Cited

U.S. PATENT DOCUMENTS

| | | | |
|---|---|---|---|
| 3,913,098 | 10/1975 | Nakamura et al. | 340/326 X |
| 4,112,744 | 9/1978 | Tassano | 73/61.61 |
| 4,297,686 | 10/1981 | Tom | 340/604 |
| 4,655,076 | 4/1987 | Weihe et al. | 73/73 |
| 4,680,537 | 7/1987 | Miller | 340/515 X |
| 5,091,715 | 2/1992 | Murphy | 340/604 |

*Primary Examiner*—Brent Swarthout
*Assistant Examiner*—Thomas J. Mullen, Jr.

[57] ABSTRACT

An electric alarm which includes a dual tone electronic chime, light emitting diode (LED) indicators, electronic circuitry, batteries, and with the exception of the AC adapter and the water sampler, all active and passive devices are housed in a small box to detect wet environments such as water that leaks from defective hot water heater tanks, flooded basements, storage spaces, room spaces below sea level, or any other spaces or tangible things not readily accessible or observable. It uses a water-activated-dielectric capacitor as a water sampler to absorb a small amount of water as the sample. And when it becomes wet or damp, the water dielectric signal controls the current required to energize the gate of the silicon control rectifier (SCR). In turn, the SCR turns "ON" a dual tone electronic chime and also turns "ON" a LED that simply glows. This action provides the audible and visual alert warning signals to indicate that the water does in fact exist. An automatic power supply change-over circuit is incorporated to allow the power failures of the primary power supply along with one of the two back-up power supplies to occur simultaneously or sequentially without interrupting the normal operation of this equipment.

1 Claim, 2 Drawing Sheets

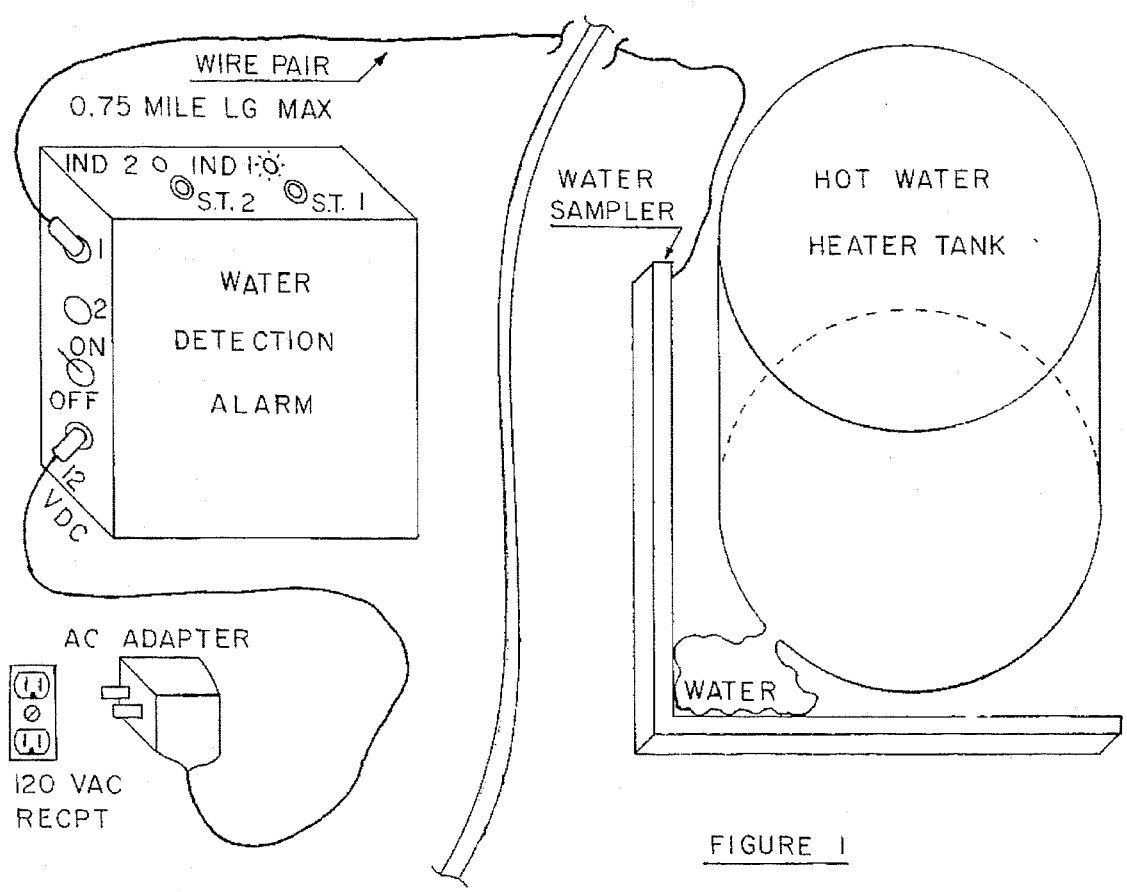
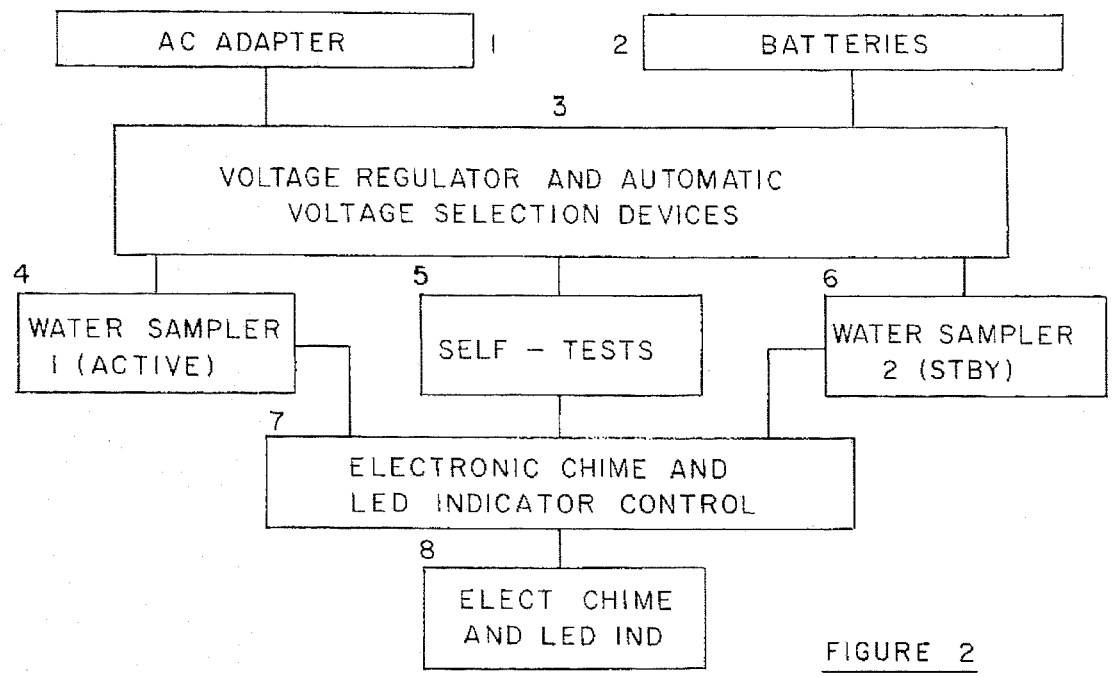
FIGURE 1
FIGURE 2

WATER DETECTION ALARM

BACKGROUND OF THE INVENTION

There always has been a need to know whether your basement, or your valuable storage room is flooded, or water has leaked from your hot water heater tank, which not only saturates your wall to wall carpeting and creates an undesirable odor, but it costs you plenty for electricity to heat the wasted hot water and to replace the carpets. There are a number of reasons that hot water heater tanks leak and that water leaks into basements and into your valuable storage spaces that are not obvious. Just to name a few; items like corroded and rusty water pipes, broken windows, and deteriorated roofs are some of the common causes of these disasters, especially during the period of the hurricane season from June 1 to November 30 of each year when heavy rainfalls can ruin your life time savings. There are numerous devices available to detect and monitor the water levels, but there seems to be no devices designed for the specific purpose of this invention, that is to detect the existence of the water itself.

SUMMARY

The main objective of this invention is to detect the water that has leaked into the basements, storage rooms, hot water heater spaces, or any other spaces or tangible things not readily accessible or observable. This Water Detection Alarm includes a two tone electronic chime, light emitting diode (LED) indicators, electronic circuitry, two 9-volt batteries, an AC adapter, and a water-activated-dielectric capacitor used as a water sampler. With the exception of the AC adapter and the water sampler, all components are housed in a small box about the size of a half gallon milk carton. A water sampler, or a number of water samplers maybe use to absorb the sampled water where it is most likely to exist. That is at the lowest point near the sea level. The maximum distance that the water sampler maybe placed away from the main Water Detection Alarm unit is about 0.75 miles or 4000 feet and connected by a wire pair of a telephone cable. Once the water is sampled, an alarm sounds (about 75 to 80 decibel-active) and a LED glows. Both are sharing the same circuit current to produce the audible and visual alert warning signals. Also two Self-test circuits are incorporated to simulate the alarms so that periodic self-tests can be done to determine the operational status of the equipment. Like any electrical system, a reliable power supply source is a very important element. In this case, a very common universal AC adapter is used as a primary source. It converts 120 VAC regular house electricity to 12 VDC output. This 12 VDC feeds a voltage regulator adjusted for 9.1 VDC as a normal operating source of power supply. Also two 9-volt batteries independently isolated from each other, will provide 200% back-up whenever the primary source fails. The automatic selection of the operating voltage source without interruption will be accomplished by the Schottky rectifiers. It's unlikely, but If the primary voltage source and one of the 9-volt batteries have failed, the 2nd back-up battery will be automatically selected to carry on the operation without interruption. Also, if there is no water under the water sampler, there is no current drain from the battery. Therefore, the normal life expectancy of the back-up batteries can easily last at least as long as their shelf-life dictated by its manufacturer, usually about 2 to 4 years.

BRIEF DESCRIPTION OF DRAWINGS

FIG. 1 shows a plan view of the entire system and related assemblies to include the main Water Detection Alarm assembly, the water sampler, and the AC adapter assembly.

FIG. 2, a block diagram shows the function of each block and the sequence of events.

DESCRIPTION OF THE PREFERRED EMBODIMENT(S)

Figure 3:
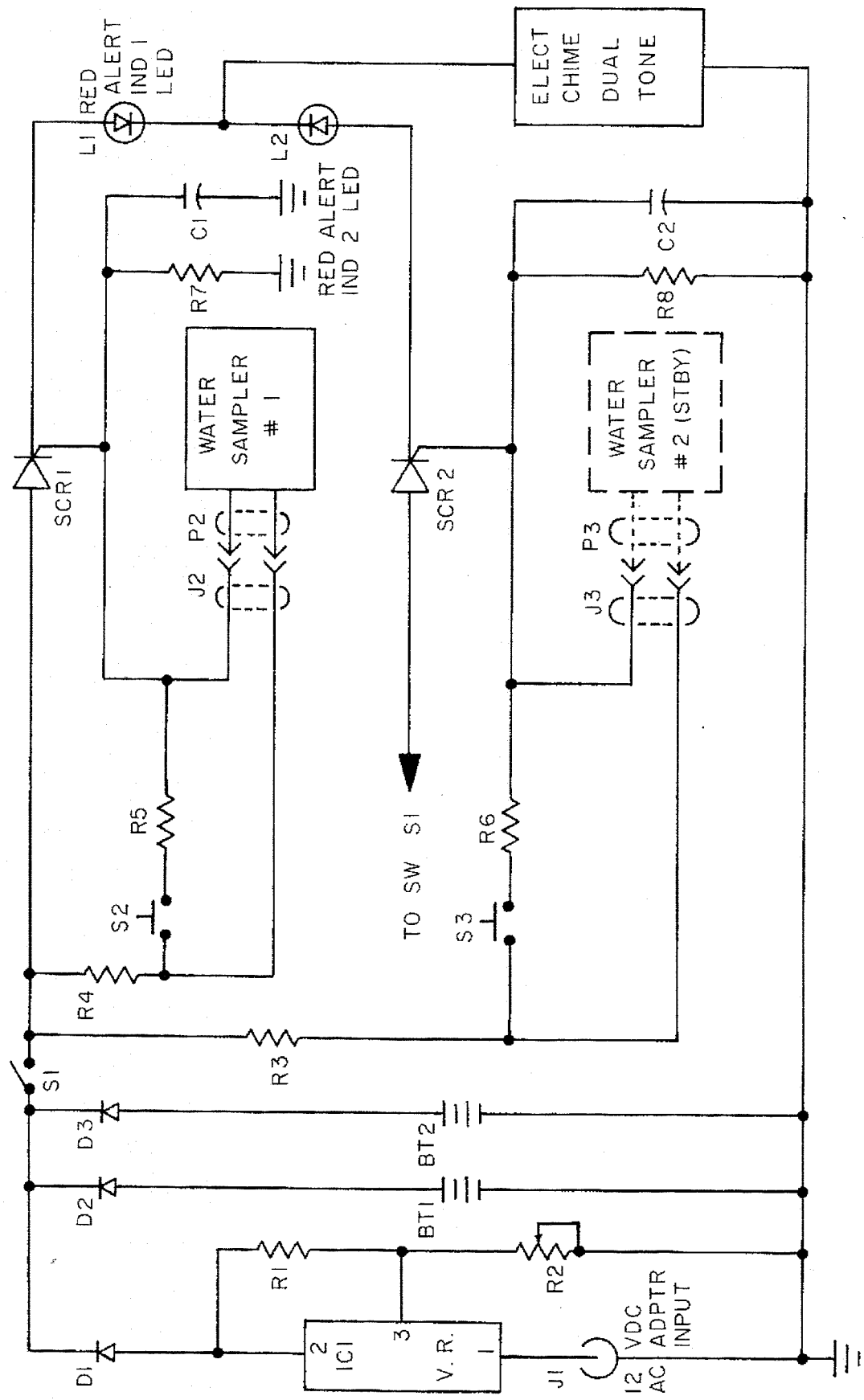
FIG. 3, a schematic diagram shows all the active and passive devices and the configurations of the electronic circuitry to suit requirements.

Ref. FIGS. 2 and 3. An AC (alternating current) adapter with output of 12 VDC (volt direct current) plugs into J1 Jack of the Water Detection Alarm. This 12 VDC is the input to the voltage regulator which is adjusted by resistor R2 for 9.1 volts to be used by the electronic circuitry as normal voltage source of supply. Two 9-volt batteries (BT1 and BT2) are independently isolated from each other by Schottky rectifiers D2, and D3, and connected as back-up battery #1 and #2. The automatic voltage source selection as to which of the 3 voltage sources to be used at any one given time is accomplished by the Schottky rectifiers (semiconductor diodes D1, D2, and D3) that allows the higher voltage as the power supply source. This allows the equipment to continue to function normally without any interruption when the primary source fails. As the power switch, S1, is turned to "on" position, the highest voltage source of 9.1 volts comes from the voltage regulator and it will be selected by D1 as primary source of power supply.

The water-activated-dielectric capacitor that is used as a water sampler has two electrodes with an air dielectric or some non-conductive water absorbent material such as paper between the electrodes. The thickness and size of the water absorbent material; the shape, size, and the gap distance between the electrodes; and the shape, and size of the water sampler are all variable to meet situational requirements. In general, the capacitance of the water-activated-dielectric capacitor is between 0.01 micro farad to 15 micro farads. During a normal operation, if the water sampler is not wet and it has no water under it to be sampled, then, no alarm will take place. However, if there is water under the water sampler, the water sampler will absorb a small amount of water. As soon as the water sampler is wet or damp, the dielectric of the water allows the circuit current to pass and turn "ON" the gate of the silicon control rectifier, SCR1, or SCR2. In turn, the SCR1 or SCR2 energizes the red alert #1 or red alert #2 indicator respectively along with the electronic chime. The active channel is associated with the water sampler #1, SCR1, and red alert #1 indicator while the inactive (standby) channel is associated with the water sampler 2, SCR2, and red alert #2 indicator. This provides the audible and the visual alert warning alarms.

Two Self-test circuits are included to allow you to test, and simulate the operational status of the Water Detection Alarm equipment system. To self-test the Water Detection Alarm, you simply turn the power switch, S1, to "ON" position and push down on the momentary "ON" switch, S2, or S3. Resistor R4 or R5 is momentarily in the circuit to allow proper current to pass, to turn "ON" the gate of the silicon control rectifier, SCR1 or SCR2 at the time when S2 or S3 is pushed down to momentary closed position. When SCR1 or SCR2 is "ON", it controls/energizes the dual tone electronic chime and the glowing of the LED, L1 or L2. To shut "OFF" the alarms, turn power switch, S1, to "OFF"

position. The preferred elements for this invention are the water-activated-dielectric capacitors, silicon control rectifiers, dual tone electronic chime, LED indicators, Schottky rectifiers, and push-button momentary closed switches.

I claim:

1. An alarm system that energizes one or more alarms when the presence of water in a given environment is detected, comprising:

a dielectric capacitor for placement in said given environment and responsive to the presence of water for providing a first output signal;

alarm means including an electronic chime and a light emitting diode (LED);

a pushbutton momentarily-closed switch for providing a second output signal when manually actuated, for testing the operability of said alarm means;

a silicon-controlled rectifier (SCR) for triggering said alarm means responsive to receipt of either of said first and second output signals;

two or more voltage sources, one of which includes a source of alternating current, an AC adapter for receiving the alternating current and providing a 12 volts DC output, and a voltage regulator for converting the 12 volts DC output into a 9.1 volt DC supply, the other one or more voltage sources each normally providing an output of 9 volts DC; and a plurality of Schottky rectifiers corresponding in number to the number of said voltage sources, for automatically determining which of the two or more voltage sources is at the highest voltage level and connecting that voltage source to the remainder of the alarm system for providing power thereto.

* * * * *